United States Patent
Voss et al.

(10) Patent No.: US 7,455,723 B2
(45) Date of Patent: Nov. 25, 2008

(54) HYDROGEN STORAGE AND RELEASE DEVICE

(75) Inventors: Mark G. Voss, Franksville, WI (US); Joseph R. Stevenson, Kenosha, WI (US); Gregory A. Mross, Franklin, WI (US)

(73) Assignee: Modine Manufacturing Company, Racine, WI (US)

( * ) Notice: Subject to any disclaimer, the term of this patent is extended or adjusted under 35 U.S.C. 154(b) by 405 days.

(21) Appl. No.: 11/315,669

(22) Filed: Dec. 22, 2005

(65) Prior Publication Data

US 2007/0144349 A1 Jun. 28, 2007

(51) Int. Cl.
*F17C 11/00* (2006.01)

(52) U.S. Cl. .............. 96/126; 206/0.7; 96/146

(58) Field of Classification Search ........... 96/108, 96/121, 126, 146; 502/526; 423/248, 648.1; 206/0.7; 420/900
See application file for complete search history.

(56) References Cited

U.S. PATENT DOCUMENTS

| | | | |
|---|---|---|---|
| 4,016,836 A | 4/1977 | MacKay et al. | |
| 4,165,569 A | 8/1979 | Mackay | |
| 4,187,092 A * | 2/1980 | Woolley | 62/46.2 |
| 4,457,136 A | 7/1984 | Nishizaki et al. | |
| 4,510,759 A | 4/1985 | Sakai et al. | |
| 4,548,044 A | 10/1985 | Sakai et al. | |
| 4,548,186 A | 10/1985 | Yamaji et al. | |
| 4,570,446 A | 2/1986 | Matsubara et al. | |
| 5,082,048 A | 1/1992 | Iwaki et al. | |
| 6,423,379 B1 * | 7/2002 | Ewing | 427/387 |
| 6,616,738 B2 | 9/2003 | Iwamoto et al. | |
| 6,626,323 B2 * | 9/2003 | Stetson et al. | 220/577 |
| 6,709,497 B2 | 3/2004 | Myasnikov et al. | |
| 7,112,239 B2 * | 9/2006 | Kimbara et al. | 96/108 |

FOREIGN PATENT DOCUMENTS

SE 518845 11/2002

* cited by examiner

*Primary Examiner*—Frank M Lawrence
(74) *Attorney, Agent, or Firm*—Michael Best & Friedrich LLP

(57) ABSTRACT

A hydrogen storage and release device (10) is provided for storing and releasing hydrogen from a metal hydride (30) contained in the device (10) based on heat transfer to or from a coolant flow provided through the device (10). The device (10) includes a housing (12) and a metal hydride containing a tube bundle located within the housing (12), with the exteriors (26) of the tubes (16) of the bundle (14) being reduced over a selected length to provide a free flow area for the coolant flow.

17 Claims, 2 Drawing Sheets

HYDROGEN STORAGE AND RELEASE DEVICE

FIELD OF THE INVENTION

This invention is directed towards devices that store and release hydrogen, and more particularly, to such devices that store or release hydrogen as a result of heat transfer to or from a coolant flowing through the device.

BACKGROUND OF THE INVENTION

Because of environmental concerns and the laws of supply and demand, there is an increasing desire to utilize so-called "alternative fuels". In this regard, hydrogen is increasingly being considered as one such "alternative fuel". Furthermore, hydrogen has many known uses in addition to it's role as an "alternative fuel". In view of the foregoing, there is a desire for devices that store and release hydrogen.

In this regard, metal hydrides or alloy materials have been used for the storage and release of hydrogen because of their ability to absorb gaseous hydrogen, much like a sponge absorbs water. In simple terms, when heat is removed from the metal hydrides, chemical reactions occur and solid metal hydrogen compounds are formed thereby absorbing gaseous hydrogen. Conversely, gaseous hydrogen is released when heat is added to the metal hydrides. U.S. Pat. No. 6,616,738 issued to Iwamoto et al discloses one example of a device that utilizes metal hydrides to store and release hydrogen. While devices such as disclosed in Iwamoto et al may prove satisfactory for their intended use, there is always room for improvement.

SUMMARY OF THE INVENTION

In accordance with one feature of the invention, a hydrogen storage and release device is provided and includes a housing and a bundle of elongate tubes within the housing. The bundle has a length extending parallel to a longitudinal axis between first and second ends of the bundle, with each of the tubes of the bundle having an interior and an exterior. A coolant flow path extends parallel with the longitudinal axis and is defined at least in part between the exteriors of adjacent tubes within the bundle. At least some of the tubes having exteriors with reduced transverse cross-sectional sizes extending over a localized portion of the length. A metal hydride is contained within the interiors of the tubes in heat exchange relation with said coolant flow path. The device further includes a hydrogen port on the housing, a hydrogen plenum located to direct hydrogen between the hydrogen port and the interior of the tubes, a first coolant port on the housing spaced from the localized portion of the length along the longitudinal axis; and a second coolant port on the housing adjacent the localized portion of the length.

In one feature, the exteriors of the tubes are cylindrical, and the tubes of the bundle are arranged so that the exteriors of adjacent tubes have line contacts with each other over the length except over the localized portion of the length where the exteriors of the adjacent tubes have no contact with each other.

According to one feature, each of the tubes has an open end and a closed end, each of the open ends is connected to the hydrogen plenum, and each of the closed ends is located adjacent the first coolant port.

In accordance with one feature, the hydrogen storage and release device further includes a first coolant plenum located between the closed ends of the tubes and the first coolant port, and a second coolant plenum at the localized portion of the length.

In one feature, the coolant flow path is also defined between the housing and an outermost set of the tubes of the bundle.

In accordance with one feature of the invention, a hydrogen storage and release device is provided and includes an elongated housing extending along a longitudinal axis, the housing having a first end and a second end, the ends spaced from each other along the longitudinal axis. The device further includes a bundle of elongate tubes within the housing and extending parallel with the longitudinal axis, the bundle having an outermost set of tubes, and each of the tubes of the bundle having an interior and an exterior. A coolant flow path extends parallel with the longitudinal axis and is defined between the exteriors of adjacent tubes within the bundle and between the housing and the exteriors of the outermost set of tubes of the bundle. Metal hydride is contained within the interiors of the tubes in heat exchange relation with said coolant flow path. The device further includes a hydrogen port on the first end of the housing; a hydrogen plenum located in the housing adjacent the first end to direct hydrogen between the hydrogen port and the interior of the tubes; a first coolant port on the second end of the housing; a first coolant plenum located in the housing adjacent the second end of the housing to direct coolant between the first coolant port and the coolant flow path; a second coolant port on the housing at a location along the axis between the hydrogen plenum and the first coolant plenum; and a second coolant plenum located in the housing at the location along the axis to direct coolant between the second coolant port and the coolant flow path.

In one feature, at least some of the tubes have exteriors with a reduced transverse cross-sectional size at the location, with the second coolant plenum being at least partially defined by the exteriors at the location.

According to one feature, the second plenum is located adjacent the hydrogen plenum.

In accordance with one feature, the exteriors of the tubes are cylindrical, the tubes of the bundle are arranged so that the exteriors of adjacent tubes have line contacts with each other over a length of the adjacent tubes extending between the first and second coolant plenums, and the exteriors of at least some of the tubes are reduced in size so that there is no contact with the exteriors of adjacent tubes at the location.

As one feature, the exteriors of adjacent tubes are brazed to each other along the line contacts.

In one feature, the hydrogen plenum is defined between the first end of the housing and a header plate in the housing, with the header plate having a plurality of openings receiving open ends of the tubes of the bundle. As a further feature, the exteriors of at least some of the tubes are swagged to a reduced cross-sectional size over a length of each tube adjacent the open end. As yet a further feature, each of the tubes has a closed end opposite from the open end and located adjacent the first plenum.

According to one feature, the first coolant plenum is defined by an interior volume located between the second end of the housing and the end of the tube bundle.

In one feature, joints within the housing and tube bundle are brazed together.

Other objects, features, and advantages of the invention will become apparent from a review of the entire specification, including the appended claims and drawings.

DETAILED DESCRIPTION OF THE PREFERRED EMBODIMENT

Figure 1:
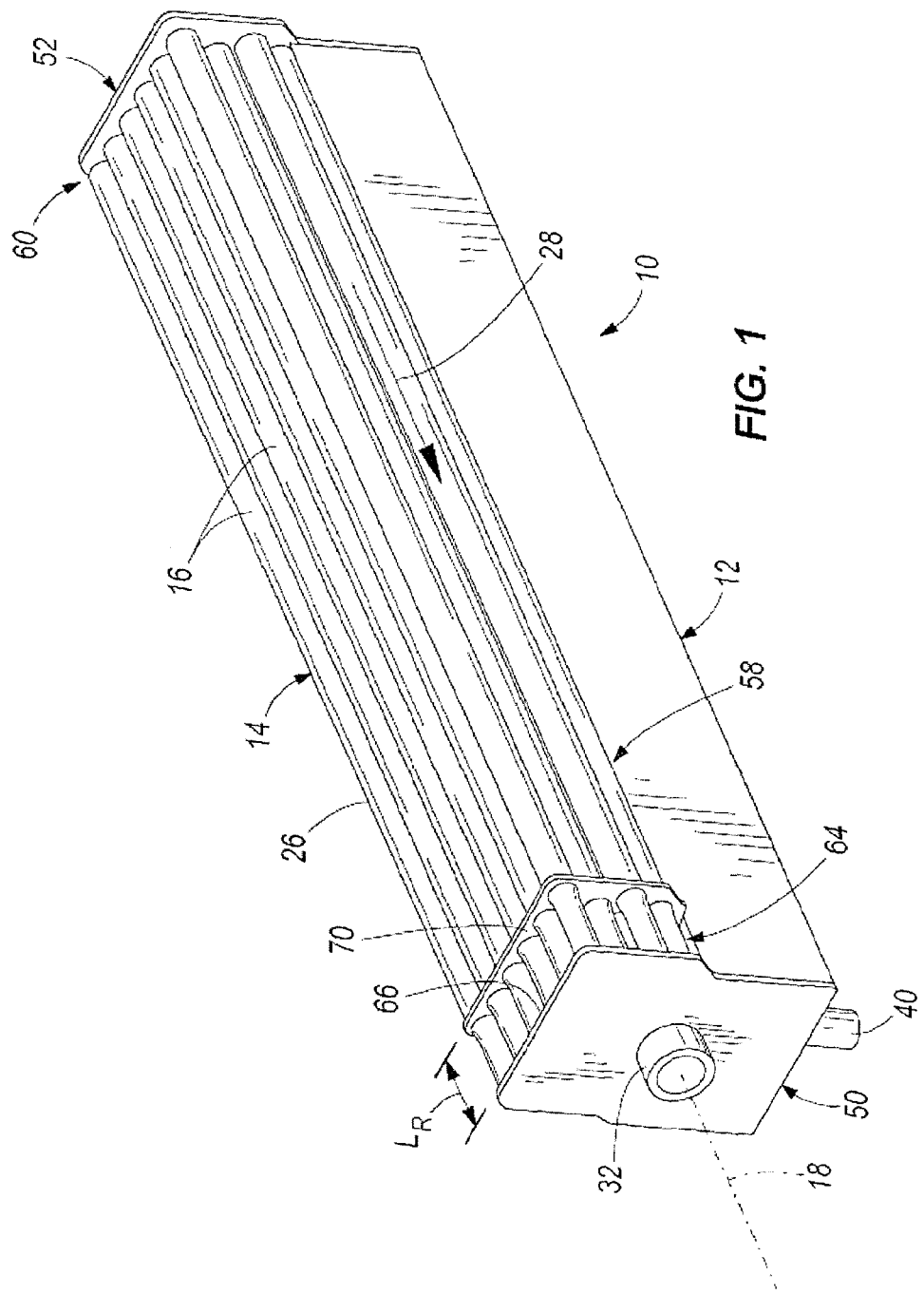
FIG. 1 is a partially broken, perspective view of a hydrogen storage and release device embodying the present invention.
Figure 2:
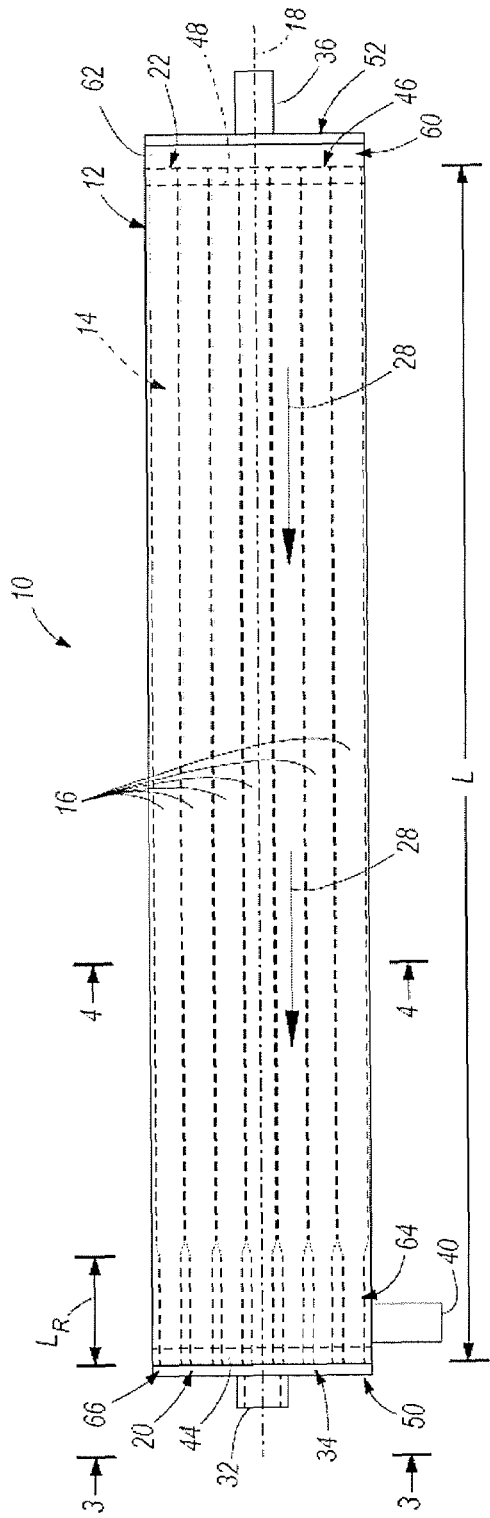
FIG. 2 is a side view of the device of FIG. 1 showing internal components in phantom and modified by the elimination of an internal baffle plate.
Figure 3:
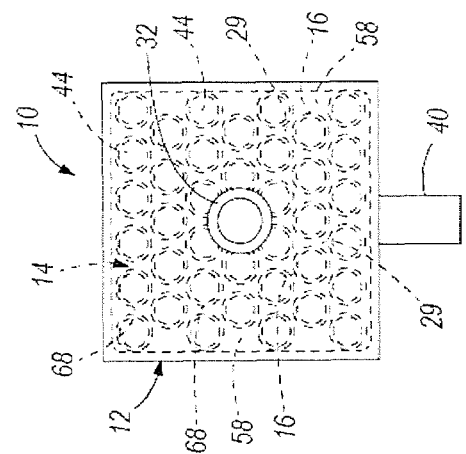
FIG. 3 is a view taken from lines 3-3 in FIG. 2.

With reference to FIGS. 1-3, a hydrogen storage and release device 10 is provided for storing and releasing hydrogen from a metal hydride in the device 10 based on heat transfer to or from a coolant flow provided through the device 10. The device 10 includes a housing 12 and a bundle 14 of elongate tubes 16 within the housing 12. The bundle 14 has a length L extending parallel to a longitudinal axis 18 between first and second ends 20 and 22 of the bundle 14, with each of the tubes 16 of the bundle 14 having an interior 24 and an exterior 26. A coolant flow path 28 extends parallel with the longitudinal axis 18 and is defined, at least in part, by cusps 29 formed between the exteriors of adjacent tubes 16 within the bundle 14. At least some of the tubes 16 having exteriors with reduced transverse cross-sectional sizes extending over a localized portion $L_R$ of the length L. A metal hydride 30 (preferably in powder form) is contained within the interiors of the tubes 16 in heat exchange relation with said coolant flow path 28. The device 10 further includes a hydrogen port 32 on the housing 12, a hydrogen plenum 34 located to direct hydrogen between the hydrogen port 32 and the interiors 24 of the tubes 16, a first coolant port 36 on the housing 12 spaced from the localized portion $L_R$ along the longitudinal axis 18; and a second coolant port 40 on the housing 12 adjacent the localized portion $L_R$ of the length.

It should be understood that while the coolant flow path 28 is shown in the preferred embodiments as extending parallel with the longitudinal axis 18, in some embodiments it may be desirable for there to be localized cross flow of the coolant with respect to the longitudinal axis 18, such as could be created by alternating transverse baffle plates that would create a zigzag flow of the coolant as it passes through the device 10.

Figure 4:
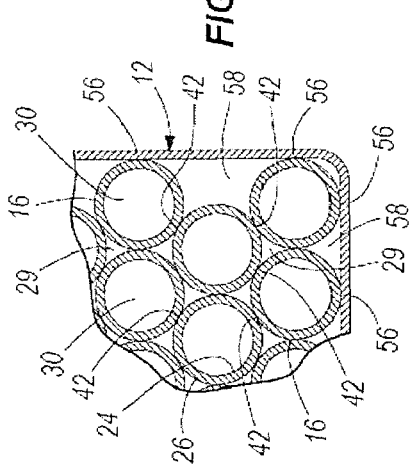
FIG. 4 is an enlarged, partial section taken from lines 4-4 in FIG. 2.

While any suitable tube shape may be used and many such shapes are known, the exteriors 26 of the tubes 16 are preferably cylindrical. As best seen in FIG. 4, it is also preferred that the tubes 16 of the bundle 14 be arranged so that the exteriors 26 of adjacent tubes 16 have line contacts 42 with each other over the length L, except over the localized portion $L_R$ where the exteriors of the adjacent tubes intentionally have no contact with each other because of the reduced cross-sectional size, i.e. reduced outside diameter. As will be explained in more detail below, this reduced cross-sectional size opens the cusps 29 and creates a free flow area in the localized portion $L_R$ that allows for the coolant flow to enter or exit the coolant flow path 28 in the tube bundle 14. It is preferred that the exteriors 26 of adjacent tube 16 be brazed or other-wise bonded to each other along the line contacts 42, which adds mechanical strength to the individual tubes. In this regard, the tubes 16 can be filled with the metal hydride 30 in the form of a metal hydride powder before brazing the tubes 16 together.

Preferably, each of the tubes 16 has an open end 44 and a closed end 46, with each of the open ends 44 being connected to the hydrogen plenum 34, and each of the closed ends 46 being located adjacent the first coolant port 36. While the end 46 may be closed using any suitable means, in the illustrated embodiment an internal plug or cap 48 is provided in each end 46 to close the same. It is preferred that for each tube 16, the reduced cross-sectional size extend from the open end 44 over a length of the tube 16 corresponding to the length $L_R$, and with the tube being swaged to form the reduced cross-sectional size.

The housing 12 is preferably elongated and extends along the axis 18 between a first end 50 and a second end 52, with an internal transverse cross sectional shape that generally conforms to the radially outer profile of the tube bundle 14 as defined by an outermost set 54 of the tubes 16. In this regard, it is also preferred that the exteriors 26 of the outermost set 54 of the tubes 16 have line contacts 56 with the housing 12 and be brazed along the line contacts 56, which adds mechanical strength to the housing. The coolant flow path 28 can also be partially defined by the cusps 58 formed between the exteriors 26 and the housing 12.

Preferably, a first coolant plenum 60 is located in the housing 12 between the closed ends 46 of the tubes 16 and the first coolant port 36, with the plenum 60 being defined by a short interior volume 62 located between the second end 52 of the housing 12 and the second end 22 of the tube bundle 14. The plenum 60 serves to direct coolant between the coolant flow path 28 and the first coolant port 36 which is preferably located on the second end 52 of the housing 12.

The reduced size exteriors 26 of the localized portion $L_R$ of the tube bundle 14 define, at least in part, a second coolant plenum 64 that directs the coolant between the second coolant port 40 and the coolant flow path 28. As best seen in FIG. 2, the second coolant port is preferably located on a side of the housing 12 at a location along the axis 18 that corresponds to the location of the localized portion $L_R$.

It is preferred that the hydrogen plenum 34 be defined between the first end 50 of the housing and a header plate 66 that is bonded, such as by brazing, to the interior of the housing 12 to prevent cross contamination between the hydrogen and the coolant flow. The header plate 66 has a plurality of tube receiving openings 68, each receiving one of the open ends 44 of the tubes 16 and being bonded thereto, such as by brazing, to prevent cross contamination between the hydrogen and the coolant flow. Preferably, the hydrogen port 32 is on the first end 50 of the housing 12.

In the embodiment of FIG. 1, a baffle plate 70 is located on the opposite end of the second plenum 64 from the header plate 66 and is shaped to block the cusps 58 so as to prevent bypass of the coolant flow therethrough. While the baffle plate 70 can be preferred, in some applications it may be desirable to eliminate the baffle plate 70.

In one preferred embodiment, the above described components of the device 10 are made of aluminum (Al 3003). It is also preferred that all of the various joints or interfaces of the device 10 be brazed, and even more preferably brazed using a suitable Controlled Atmospheric Brazing process. In this regard it should be noted that the above described construction allows for such brazing processes.

In operation, a coolant flow enters one of the ports 36 and 40, flows through the coolant flow path 28 and exits the other port 36,40. Depending on the relative temperatures between the coolant flow and the metal hydride 30 contained in the tubes 16, heat is either transferred from the metal hydride 30 to the coolant, thereby resulting in storage of hydrogen within the device 10, or heat is rejected from the coolant to the metal hydride 30 in the tubes 16, thereby resulting in the release of hydrogen from the device 10.

While each of the ports 36 and 40 can serve as a coolant inlet or a coolant outlet, it is preferred for the port 36 to serve as the coolant inlet and the port 40 to serve as the coolant outlet.

The specific design parameters (such as material selection, dimensions, connection type) will be highly dependent upon the specifics of each particular application. In one example of a suitable embodiment, the housing has a transverse cross-section of approximately 4.3"×4.4" and is 24" long, the tube bundle 14 includes 39 tubes 16, each tube 16 has a 0.688" outside diameter and a 0.063" wall thickness, the reduced size exteriors are swaged down to a 0.563" outside diameter over a length $L_R$ equal to 2", the hydrogen port 32 is provided in the form of a 0.5" FNPT boss, and each of the coolant ports is provided in the form of a 0.75" beaded hose connection.

While some specific embodiments have been disclosed and discussed herein, it should be understood that there are many possible alternatives to the specific constructions disclosed herein. For example, in some embodiments it may be desirable to utilize different size tubes and/or other packing arrangements of the tubes 16 within the bundle 14. By way of another example, it some embodiments it may be desirable to have extended surfaces for heat transfer within the tubes 14 themselves and/or extending into the coolant flow path 28.

It should be understood that as used herein, the term coolant is used broadly to refer to any fluid, whether liquid or gas phase, that can either absorb heat from or supply heat to the metal hydride 30 contained within the tubes 16.

The invention claimed is:

1. A hydrogen storage and release device comprising:
   a housing;
   a bundle of elongate tubes within the housing, the bundle having a length extending parallel to a longitudinal axis from a first end to a second end, each of the tubes of the bundle having an interior and an exterior, a coolant flow path defined at least in part between the exteriors of adjacent tubes within the bundle, at least some of the tubes having exteriors with reduced transverse cross-sectional sizes extending over a localized portion of the length;
   metal hydride contained within the interiors of the tubes in heat exchange relation with said coolant flow path;
   a hydrogen port on the housing; a hydrogen plenum located to direct hydrogen between the hydrogen port and the interior of the tubes;
   a first coolant port on the housing spaced from the localized portion of the length along the longitudinal axis; and
   a second coolant port on the housing adjacent the localized portion of the length.

2. The hydrogen storage and release device of claim 1 wherein the exteriors of the tubes are cylindrical, and the tubes of the bundle are arranged so that the exteriors of adjacent tubes have line contacts with each other over the length except over the localized portion of the length where the exteriors of the adjacent tubes have no contact with each other.

3. The hydrogen storage and release device of claim 2 wherein the exterior of the tubes are brazed to each other along the lines of contact.

4. The hydrogen storage and release device of claim 1 wherein each of the tubes has an open end and a closed end, each of the open ends is connected to the hydrogen plenum, and each of the closed ends is located adjacent the first coolant port.

5. The hydrogen storage and release device of claim 4 further comprising:
   a first coolant plenum located between the closed ends of the tubes and the first coolant port; and
   a second coolant plenum at the localized portion of the length.

6. The hydrogen storage and release device of claim 1 wherein the coolant flow path is also defined between the housing and an outermost set of the tubes of the bundle.

7. The hydrogen storage and release device of claim 1 wherein joints within the housing and tube bundle are brazed together.

8. A hydrogen storage and release device comprising:
   an elongate housing extending along a longitudinal axis, the housing having a first end and a second end, the ends spaced from each other along the longitudinal axis;
   a bundle of elongate tubes within the housing and extending parallel with the longitudinal axis, the bundle having an outermost set of tubes, each of the tubes of the bundle having an interior and an exterior, a coolant flow path defined between the exteriors of adjacent tubes within the bundle and between the housing and the exteriors of the outermost set of tubes of the bundle;
   metal hydride contained within the interiors of the tubes in heat exchange relation with said coolant flow path;
   a hydrogen port on the first end of the housing;
   a hydrogen plenum located in the housing adjacent the first end to direct hydrogen between the hydrogen port and the interior of the tubes;
   a first coolant port on the second end of the housing;
   a first coolant plenum located in the housing adjacent the second end of the housing to direct coolant between the first coolant port and the coolant flow path;
   a second coolant port on the housing at a location along the axis between the hydrogen plenum and the first coolant plenum; and
   a second coolant plenum located in the housing at the location along the axis to direct coolant between the second coolant port and the coolant flow path.

9. The hydrogen storage and release device of claim 8 wherein the second plenum is located adjacent the hydrogen plenum.

10. The hydrogen storage and release device of claim 8 wherein the exteriors of the tubes are cylindrical, the tubes of the bundle are arranged so that the exteriors of adjacent tubes have line contacts with each other over a length of the adjacent tubes extending between the first and second coolant plenums, and the exteriors of at least some of the tubes are reduced in size so that there is no contact with the exteriors of adjacent tubes at the location.

11. The hydrogen storage and release device of claim 10 wherein the exteriors of adjacent tubes are brazed together along the lines contacts.

12. The hydrogen storage and release device of clam 8 wherein the hydrogen plenum is defined between the first end of the housing and a header plate in the housing, the header plate having a plurality of openings receiving open ends of the tubes of the bundle.

13. The hydrogen storage and release device of claim 12 wherein the exteriors of at least some of the tubes are swagged to a reduced cross-sectional size over a length of each tube adjacent the open end.

14. The hydrogen storage and release device of claim 13 wherein each of the tubes has a closed end opposite from the open end and located adjacent the first plenum.

15. The hydrogen storage and release device of claim 8 wherein the first coolant plenum is defined by an interior volume located between the second end of the housing and the end of the tube bundle.

16. The hydrogen storage and release device of claim 8 wherein joints within the housing and tube bundle are brazed together.

17. The hydrogen storage and release device of claim 8 wherein the exteriors of at least some of the tubes have a reduced transverse cross-sectional size at the location, the second coolant plenum at least partially defined by the exteriors having the reduced transverse cross-sectional size.

* * * * *